May 20, 1958 W. C. SHARP 2,835,389
DIATOMITE FILTER UNIT
Filed June 22, 1955
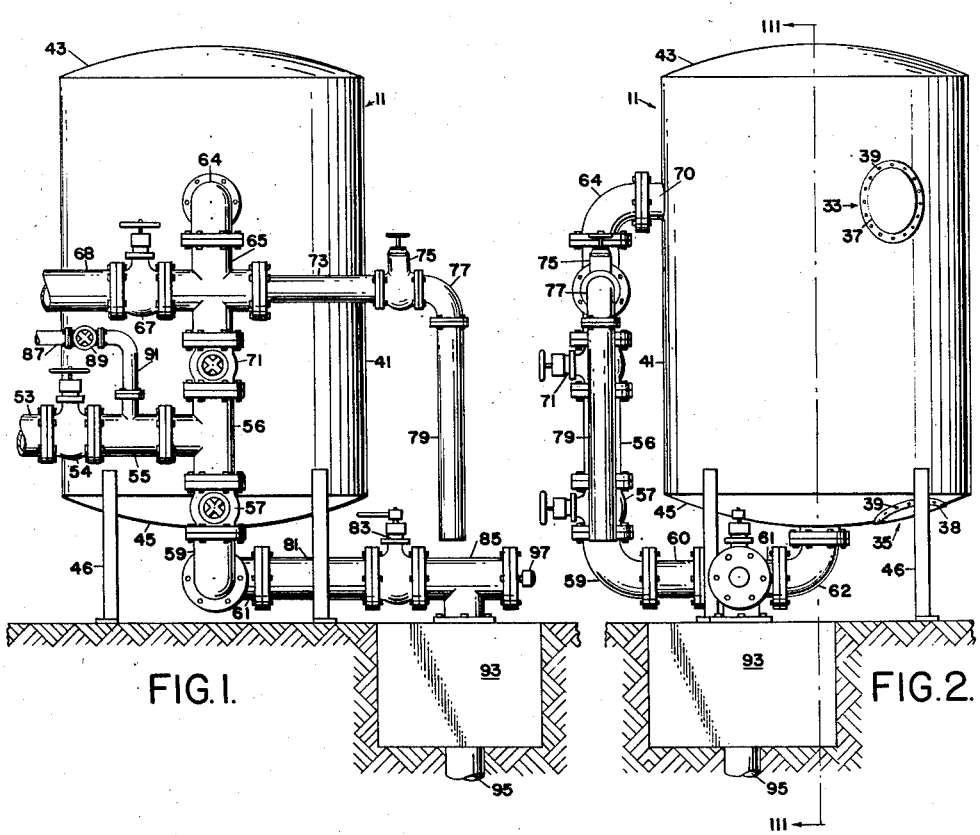
FIG.1. FIG.2.
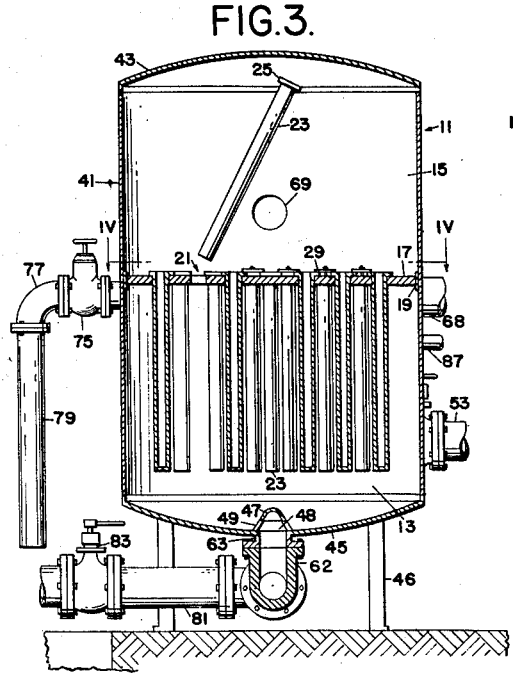
FIG.3.
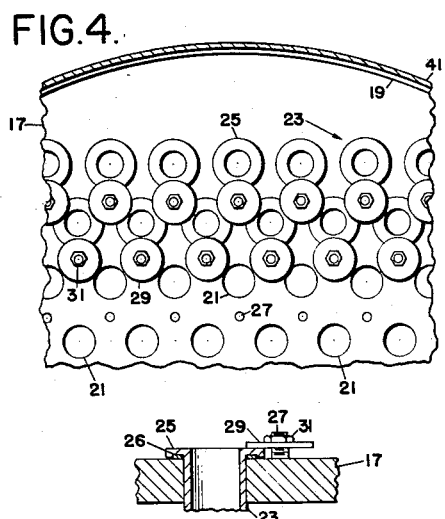
FIG.4.
FIG.5.
INVENTOR
WILLIAM C. SHARP
BY
Heatherford & Heatherford
attys

United States Patent Office 2,835,389
Patented May 20, 1958

2,835,389

DIATOMITE FILTER UNIT

William C. Sharp, Memphis, Tenn.

Application June 22, 1955, Serial No. 517,201

4 Claims. (Cl. 210—323)

This invention relates to filters utilizing diatomaceous earth, used in the filtration of drinking water, swimming pool water and other liquids.

It particularly relates to filters of the so-called upflow pressure type in which the influent water is introduced into a lower influent chamber and is forced by pressure through filter elements coated with diatomaceous earth into an upper influent chamber.

In filters of this type periodically it becomes necessary to remove the filter elements for cleaning or replacement. Heretofore access to the tank for removing the filter elements has been accomplished by providing the tank with an open top having a removable top cover, thereby necessitating removal of the top cover of the tank which is a cumbersome and time-consuming task and further requiring in many types of designs the removal of piping attached to the top cover. Heretofore, since the access to the filter elements has been from the top of the unit, it was necessary to install the unit in a location with sufficient overhead space to permit withdrawal of the filter elements. Additionally very precise machining adjacent meeting portions, such as flanges and the like, has been necessary.

The present invention is directed towards eliminating these problems by providing a filter unit having a fixed dome cover whereby simplicity and sturdiness of construction is achieved and because of the unique design of the unit the filter elements may be withdrawn internally of the tank without requiring a removable dome cover, thereby eliminating the prior requirement for space for overhead clearance in removing the elements.

This invention is further directed towards providing a filter unit having an effluent chamber which is sufficiently large to contain a substantial volume of air for use in the commonly called backwash operation in which the filter is cleaned.

It is, therefore, an object of the present invention to provide a filter unit having a unitary tank with filter elements removable therein.

A further object of the invention is to provide in such a filter unit an effluent chamber having a depth slightly in excess of the length of filter elements to permit upward withdrawal of filter elements internally thereof and subsequent removal of said elements through an access opening in said chamber.

A further object is to provide in such a filter unit means for securing filter elements in a suspending plate.

A further object of the invention is to provide in such a filter unit a tank substantially equally divided into a lower influent chamber and an upper effluent chamber, whereby a large upper effluent chamber is provided for the entrapment of air for use in the backwash operation.

A further object of the invention is generally to improve the design, construction, and efficiency of liquid filtration units.

The means by which the foregoing and other objects of the present invention are accomplished and the manner of their accomplishment will be readily understood from the following specification upon reference to the accompanying drawings, in which:

Fig. 1 is a front elevational view of the filter unit.

Fig. 2 is a side elevational view of the filter unit.

Fig. 3 is a sectional view taken as on the line III—III of Fig. 2 showing one of the filter elements as being removed.

Fig. 4 is an enlarged fragmentary sectional view taken as on the line IV—IV of Fig. 3 showing some of the filter elements removed.

Fig. 5 is a further enlarged fragmentary sectional view taken as on a vertical plane through the center line of one of the filter elements.

Referring now to the drawings in which the various parts are indicated by numerals, a tank 11, as formed of steel or the like, is divided into a lower influent chamber 13 and an upper effluent chamber 15 by a circular suspending plate 17, as formed of steel or the like, which is attached substantially at the horizontal transverse midline of the tank. The means of attachment preferably comprises an annular ring 19, as formed of steel or the like, having an outside diameter slightly smaller than the inside diameter of tank 11 and attached to the tank as by means of welding. Plate 17, which preferably has an outside diameter slightly smaller than the inside diameter of ring 19, may then be welded at its outside periphery to the inner periphery of the ring. Thus the plate is integrally fixed to the tank.

Plate 17 is provided with a plurality of apertures 21 extending vertically through the plate from top to bottom and a plurality of substantially cylindrical depending hollow filter elements 23 are respectively removably supported therein, said elements depending below the plate into the influent chamber 13. Each of elements 23 is provided at its upper end with a radially projecting flange 25 which includes a downturned peripheral lip which rests upon the upper surface of plate 17 and thereby supports element 23 from plate 17. Preferably each filter element 23 is provided with a gasket 26, disposed within the lip and interposed between flange 25 and plate 17 to provide water-tightness.

Filter elements 23 may be constructed of porous metal, porous stone, wire mesh screen or any of the porous type of filter elements well-known to the art, which will permit water to flow through the pores therein. The length of each element 23 is less than the spacing from the upper surface of plate 17 to the top of effluent chamber 15, whereby space is provided to upwardly withdraw the individual elements 23 from apertures 21. The exterior of elements 23 are coated with a filter aid, as diatomaceous earth, in a manner hereinafter described in the operation of the filter unit. Each element 23 is closed off at its lower end and open at its upper end, whereby the water to be filtered will flow through the diatomaceous earth, the interstices of the element, thence up through the hollow center of the element and into the effluent chamber 15.

Apertures 21 are disposed in staggered relationship in plate 17, as best illustrated in Fig. 4. In preferably similar staggered relationship a plurality of upstanding threaded studs 27 are attached to the upper surface of plate 17 intermediate the staggered apertures 21. A plurality of holding washers 29 are respectively removably mounted on studs 27 and respectively held in place by suitable nuts 31. Each said washer overlies portions of the upper flanges 25 of a plurality of filter elements 23, thereby providing the means for detachably securing the elements in suspending plate 17.

An upper manhole 33 is provided in the side of tank 11 communicating with effluent chamber 15 and a lower manhole 35 is provided in the bottom of the tank communicating with the influent chamber 13, whereby access is respectively provided to the chambers 15, 13 for inspection and cleaning. Manholes 33, 35 are provided with removable covers 37, 38, respectively, which provide a closure means for the manholes. Covers 37, 38 are preferably removably secured to tank 11 as by suitable studs and nut means 39, as for example threaded studs may be welded to tank 11 adjacent and around the manholes 33, 35 with the studs extending through apertures in covers 37, 38 and secured thereto by nuts. Preferably gaskets are provided between covers 37, 38 and tank 11 to insure water tightness.

Tank 11 comprises a hollow cylinder 41 enclosed at its upper end by a dome 43 attached thereto as by welding and enclosed at its lower end by a dished bottom 45, similarly attached thereto as by welding. Tank 11 is supported from the ground or other supporting surface as by means of stanchions 46. An upwardly dished conical deflector 47 overlies an aperture 48 centrally disposed in bottom 45 and is supported as by posts 49 whereby deflector means is provided for radially deflecting the influent water entering from aperture 48. The influent water passes between posts 49 and is deflected radially, whereby the stream of water is not directed towards the elements 23 which is an advantageous feature as will be apparent from the hereinafter described operation of the filter unit.

The influent piping system for conducting the water to be filtered from the source into influent chamber 13, preferably comprises sequentially connected inlet pipe 53, valve 54, T-coupling 55, T-coupling 56, valve 57, elbow pipe 59, pipe 60, T-coupling 61 and upflow pipe 62. Aperture 48 has a flanged hollow pipe section 63 depending from the edges thereof, which provides the means for attaching said influent piping system to tank 11. The effluent piping system for conducting the filtered water from the effluent chamber 15 to the site of use preferably comprises sequentially connected elbow pipe 64, four-way coupling 65, valve 67 and pipe 68. An aperture 69, provided in the side of tank 11 opening into effluent chamber 15, has a flanged hollow pipe section 70 projecting from the edge thereof, which provides the means for attaching said effluent piping system to tank 11. Aperture 69 is positioned closer to plate 17 than to dome 43, whereby a large space is provided for the entrapment of air in effluent chamber 15 above aperture 69. Said influent piping system and said effluent piping system are connected by valve 71 interposed between four-way coupling 65 and T-coupling 56. A discharge piping system is connected to four-way coupling 65. Said discharge piping system comprises sequentially connected pipe 73, valve 75, elbow pipe 77, and depending discharge pipe 79. A backwash piping system is connected to T-coupling 61. Said backwash piping system comprises sequentially connected pipe 81, quick-closing valve 83 and T-coupling 85. It is obvious that by opening or closing the proper valves said influent piping system, said effluent piping system, said discharge piping system, and said backwash piping system are selectively interconnectable.

Prior to the service run of the filter unit, filter elements 23 are pre-coated with diatomaceous earth in a manner commonly known to the art. The pre-coating operation is accomplished by introducing into the system diatomite suspended in water. Thus, diatomite suspension is introduced into said influent piping system through the conduit comprising pipe 87, valve 89 and pipe 91. During this operation valves 89, 57 and 75 should be open and valves 54, 71, 83 and 67 should be closed, whereby the diatomite suspension is forced to flow under pressure from a pre-coat make-up pot, not shown, through pipe 87, valve 89, pipe 91 into the influent piping system, and thence into the influent chamber 13 through aperture 48. When the diatomite suspension fills the influent chamber 13 the liquid will be forced into effluent chamber 15, effecting entrance through the interstices of elements 23 into the hollow centers of the elements and thence upward to chamber 15. As the liquid passes through the interstices of elements 23 the pre-coat or so-called cake will be built up on the exterior of the elements.

This build-up of diatomaceous earth aids in filtering and prevents suspended matter from clogging the interstices of the filter elements 23. The amount of build-up of the diatomaceous earth or elements 23 will be determined by the amount of diatomite introduced from said pre-coat pot and, as is known, will vary according to the filter requirements, type of installation, etc. During this pre-coating operation the effluent liquid from the filter is passed to waste through said discharge piping system since particles of the diatomaceous earth pass through filter elements 23 into effluent chamber 15. The liquid should be passed to waste until the liquid, as observed flowing from discharge pipe 79, becomes clear.

Having thus performed the pre-coating operation the filter unit is ready for the service run. For the service run valves 89, 71, 83 and 75 should be closed and valves 54, 57 and 67 opened, whereby the incoming water to be filtered is forced under pressure by a recirculating pump, not shown, from the source through inlet pipe 53 into the influent piping system and thence into influent chamber 13 through aperture 48 at the bottom of tank 11. Deflector 47 deflects the incoming water radially adjacent the bottom of tank 11, whereby the direct inflow stream of water does not play upon elements 23, otherwise the stream might wash the diatomaceous earth cake from elements 23. The water fills the influent chamber 13 and since it is under pressure from said recirculating pump it will be forced through the diatomaceous coated elements into effluent chamber 15. The particles of dirt and other foreign matter will be filtered from the water by the diatomaceous earth and filter elements which will leave the water crystal clear.

When the filtered water in effluent chamber 15 has reached the level of aperture 69 the water will flow through the aperture into said effluent piping system and thence to the point of use.

It is preferable that various accessories common to the filtering art be used in conjunction with the filter unit, as for example a hair catcher, not shown, and a slurry tank, not shown, may be interposed in the inlet pipe 53. As is known in the art of filtering, a slurry tank, from which small amounts of diatomaceous earth may be introduced continuously into the filter system, aids in providing an efficient filter system since a slow build-up of diatomite prevents the dirt from forming an impervious mat on the outside of the cake.

In the course of operation the filter unit will become inefficient due to the coated filter elements 23 absorbing so much dirt that it will become increasingly hard to force the water through the coated filter elements. It then becomes necessary to perform the so-called backwash operation. The embodiment of the present invention lends itself to an efficient backwash operation due to the unique construction of the tank whereby a substantially large effluent chamber 15 is provided which will entrap a large volume of air. It will be apparent that during a service run air that is entrained with the water being filtered will be forced upward through elements 23 and be trapped in effluent chamber 15 above the level of aperture 69. The air pressure thus built up will be utilized to accomplish the backwash operation as will be hereinafter apparent. In the backwash operation the service run is preferably discontinued by shutting off said recirculating pump and closing valve 54. During the backwash operation valves 67, 71, 75 and 89 are also closed. Then quick-opening valve 83 is opened, whereupon the water in effluent chamber 15, acted upon by said air pressure, will surge from effluent chamber 15 down through the hollow elements 23, outward through the interstices of the elements into influent chamber 13, downward through said backwash piping to a sump 93 underlying T-coupling 85 and in communication therewith, and thence discharged through pipe 95 to a sewer, not shown. Thus it will be apparent that said surge of water will separate the dirty diatomite cake from filter elements 23, whereupon said dirty diatomite cake, together with foreign matter in influent chamber 13, will be discharged to said sewer. Preferably T-coupling 85 is provided with a sight glass 97 for observation of the water discharged into sump 93. Additionally, if desired, the filter unit may be washed out by opening valves 54 and 71, thence starting said recirculating pump, whereupon the water will be caused to flow from pipe 53 through valve 54, T-coupling 55, T-coupling 56, valve 71, four-way coupling 65, pipe 64, effluent chamber 15, influent chamber 13 and out to waste through said backwash piping system.

After the backwash operation has been completed the cycle of pre-coating filter elements 23 is repeated, as heretofore described, whereupon the filter unit is ready for another service run.

Periodically it becomes necessary to remove the filter elements for a thorough cleaning, as for example by wire brushing. Heretofore removal of the filter elements has been a cumbersome and time-consuming task necessitating removal of the entire dome of the unit to permit upward withdrawal of the elements. Additionally, disassembly of the connecting piping units has been necessary in certain types of units. Also, heretofore, the installation of units sufficient overhead space had to be left clear to permit vertical removal of the elements. However, in the present invention the unique construction of the filter unit permits withdrawal of filter elements 23 from suspending plate 17 internally of the tank, whereby the dome 43 may be permanently fixed in place. Thus it will be apparent for removal of elements 23 access may be gained to effluent chamber 15 by removing manhole cover 37. To remove the individual filter elements 23 nuts 31 and washers 29 are removed from studs 27 whereupon the filter elements may be upwardly withdrawn from suspending plate 17, as illustrated in Fig. 3. Conversely, when it is desired to replace elements 23, the elements are respectively downwardly inserted in apertures 21 and secured in place by washers 29 and nuts 31.

From the foregoing description it is apparent that a filter unit is provided in which the filter elements may be withdrawn and replaced internally of the tank whereby a unitary tank may be constructed with a fixed dome which permits simplicity and sturdiness of construction. Further it is apparent that a unit is provided which permits an efficient backwash operation to be performed.

I claim:

1. In a diatomite filter unit of the up-flow pressure type adapted to be used in the filtering of water or other liquids, in combination, a tank comprising a hollow cylinder, a dome fixed at the upper end of said cylinder and a dished bottom fixed at the lower end of said cylinder, a suspending plate transversely disposed internally of said tank and attached thereto whereby said tank is divided into an upper effluent chamber and a lower influent chamber, said suspending plate being bored to form a plurality of staggered apertures, a plurality of depending porous diatomite coated filter elements respectively depending through the apertures in said suspending plate, said filter elements each having a radially extending flange adjacent its upper end overlying said suspending plate whereby said filter elements are removably supported by said suspending plate, a plurality of holding means removably attached to said suspending plate intermediate said apertures, each said holding means overlying a plurality of said filter elements whereby said filter elements are removably secured in said suspending plate, each said filter element being of a length less than the distance between said suspending plate and said dome whereby said filter elements may be upwardly withdrawn into said effluent chamber from said suspending plate, access means in the side of said cylinder communicating with said effluent chamber whereby said filter elements may be removed from said tank, said dished bottom being centrally bored to form an aperture for the introduction of liquid to be filtered into said influent chamber, a conical deflector overlying and spaced from the aperture in said dished bottom whereby liquid introduced through said aperture will be deflected away from said filter elements, means for introducing liquid to be filtered under pressure into said influent chamber through the aperture in said dished bottom whereby said liquid is forced through said filter elements into said effluent chamber, and means communicating with said effluent chamber for conducting filtered liquid to a point of use.

2. In a diatomite filter unit of the up-flow pressure type adapted to be used in the filtering of water or other liquids, in combination, a tank, a suspending plate transversely disposed internally of said tank and attached thereto whereby said tank is divided into an upper effluent chamber and a lower influent chamber, said suspending plate being bored to form a plurality of staggered apertures, a plurality of depending porous diatomite coated filter elements respectively depending through the apertures in said suspending plate, said filter elements each having a radially extending flange adjacent its upper end overlying said suspending plate whereby said filter elements are removably supported by said suspending plate, a plurality of holding means removably attached to said suspending plate intermediate said apertures, each said holding means overlying a plurality of said filter elements whereby said filter elements are removably secured in said suspending plate, each said filter element being of a length less than the height of said effluent chamber whereby said filter elements may be upwardly withdrawn into said effluent chamber from said suspending plate, access means in said tank communicating with said effluent chamber whereby said filter elements may be removed from said tank, said tank being bored centrally of the bottom thereof to form an aperture for the introduction of liquid to be filtered into said influent chamber, a conical deflector overlying and spaced from the aperture in the bottom of said tank whereby liquid introduced through said aperture will be deflected away from said filter elements, means for introducing liquid to be filtered under pressure into said influent chamber through the aperture in the bottom of said tank whereby said liquid is forced through said filter elements into said effluent chamber, and means communicating with said effluent chamber for conducting the filtered liquid to a point of use.

3. In a filter unit of the up-flow pressure type adapted to be used in the filtering of water or other liquids, in combination, a tank, a suspending plate transversely disposed internally of said tank and attached thereto whereby said tank is divided into an upper effluent chamber and a lower influent chamber, said suspending plate being bored to form a plurality of staggered apertures, a plurality of depending porous filter elements respectively depending through the apertures in said suspending plate, said filter elements each having a radially extending flange adjacent its upper end overlying said suspending plate whereby said filter elements are removably supported by said suspending plate, a plurality of holding means removably attached to said suspending plate intermediate said apertures, each said holding means overlying a plurality of said filter elements whereby said filter elements are removably secured in said suspending plate, each said filter element being of a length less than the height of said effluent chamber whereby said filter elements may be upwardly withdrawn into said effluent chamber from said suspending plate, access means in said tank communicating with said effluent chamber whereby said filter elements may be removed from said tank, said tank being bored centrally of the bottom thereof to form an aperture for the introduction of liquid to be filtered into said influent chamber, means for introducing liquid to be filtered under pressure into said influent chamber through the aperture in the bottom of said tank whereby said liquid is forced through said filter elements into said effluent chamber, and means communicating with said effluent chamber for conducting filtered liquid to a point of use.

4. In a filter unit of the up-flow pressure type adapted to be used in the filtering of water or other liquids, in combination, a tank, a suspending plate transversely disposed internally of said tank and attached thereto whereby said tank is divided into an upper effluent chamber and a lower influent chamber, said suspending plate being bored to form a plurality of apertures, a plurality of depending porous filter elements respectively depending through the apertures in said suspending plate and removably supported therein, a plurality of holding washers removably attached to said suspending plate intermediate said apertures, each said washers overlying a plurality of said filter elements whereby said filter elements are removably secured in said suspending plate, each said filter element being of a length less than the distance between said suspending plate and said dome whereby said filter elements may be upwardly withdrawn into said effluent chamber from said suspending plate, access means in said tank communicating with said effluent chamber whereby said filter elements may be removed from said tank, said tank being bored to form an aperture communicating with said influent chamber for the introduction thereof of liquid to be filtered, a deflector overlying and spaced from the aperture in said tank whereby liquid introduced through said aperture will be deflected away from said filter elements, means for introducing liquid to be filtered under pressure into said influent chamber through the aperture in said tank whereby said liquid is forced through said filter elements into said effluent chamber, and means communicating with said effluent chamber for conducting filtered liquid to a point of use.

References Cited in the file of this patent

UNITED STATES PATENTS

| | | |
|---|---|---|
| 2,271,814 | Coolidge | Feb. 3, 1942 |
| 2,562,699 | Cooperson et al. | July 31, 1951 |
| 2,570,132 | Koupal | Oct. 2, 1951 |
| 2,600,458 | Ackley | June 17, 1952 |
| 2,709,525 | Beyer et al. | May 31, 1955 |
| 2,742,158 | Schuller | Apr. 17, 1956 |